S. Groom.
Hose Coupling.
№ 9,841.            Patented July 12, 1853.
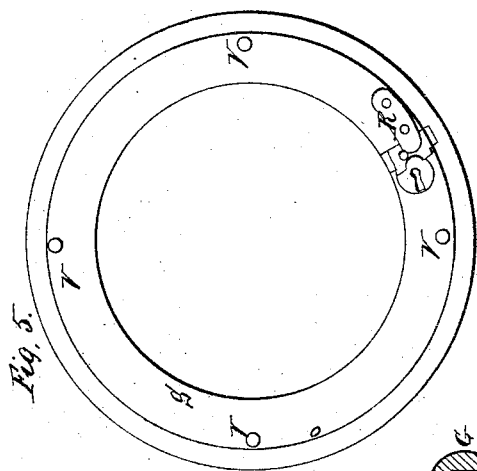
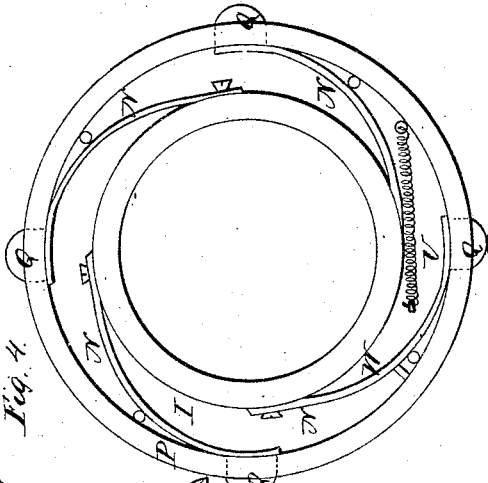
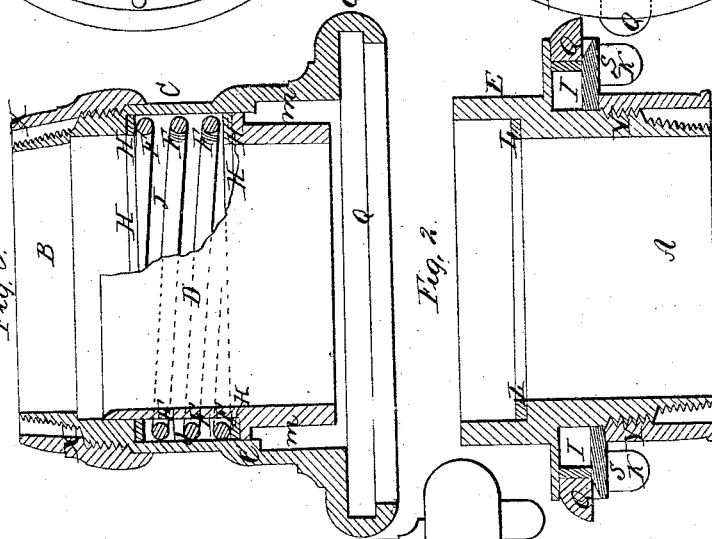
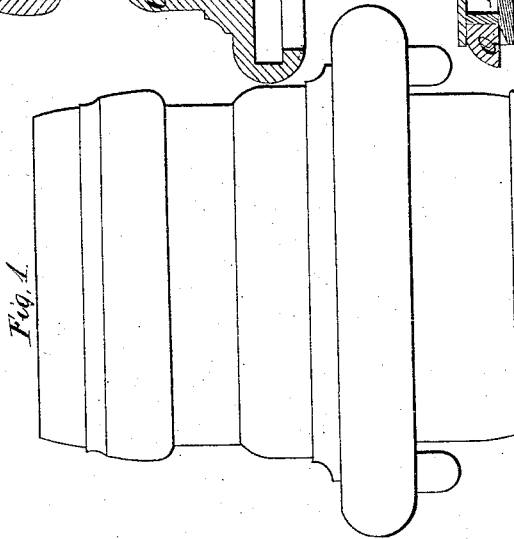

UNITED STATES PATENT OFFICE.

SMITH GROOM, OF TROY, NEW YORK.

HOSE-COUPLING.

Specification of Letters Patent No. 9,841, dated July 12, 1853.

*To all whom it may concern:*

Be it known that I, SMITH GROOM, of the city of Troy, county of Rensselaer, and State of New York, have invented a new and Improved Method of Coupling Engine or Hydrant Hose and Steam-Pipes; and I do hereby declare that the following is a full and exact description.

My invention relates to coupling sections A and B firmly together, said sections being arranged as herein specified, and are attached to the engines, hydrants, hose, or to steam pipes.

I slide the swivel E into the outer chamber of section B until the packing L rests against the spiral spring conduit D, which recedes by pressing. The points of the bolts O (being beveled on the under side) are brought to a line with and then is projected into the outer circular groove O by the bolt springs Q and N and is effectually coupled simply by pressing the said sections together, the said sections being left to swivel or turn either way freely if desirable to take out twists from the hose, or for any other purpose, the only joint in the conduit or waterway being secured against leakage by the packing L. Then by sliding up a small lock or bolt attached to and across the circular guard plate S into the partition P with a key knob or in any other way, which will make the whole coupling perfectly secure from being uncoupled by design or accidents. To separate or uncouple the said sections, I slide back the lock bolt R, then by pressing against the face of the knob K I turn the circular guard plate S in order to bring the studs or pens V from their usual place at the detent W up to the sides of the spring bolts N and Q, which will press back said spring bolts and withdraw the bolts' heads within the periphery of the partition P, and then spiral spring F acting on the spring conduit will throw the sections A and B apart, when the spiral spring U located in the inner circular groove I will draw back the circular guard plate S with the studs or pins V against the detent W, which will relieve the said spring bolts from the pressure of said studs. Then the said spring bolts are again projected through the partition P, that will place them in a position to couple or connect said sections. But to enable others skilled in the arts to make and use my said invention I will proceed to give a more particular description of the construction and its operations.

The drawings referred to are as follows, viz:

Figure 1 is a profile of the two sections of the coupling when united together, Fig. 2 is an elevation of the lesser section A divided in the center, Fig. 3 is an elevation of the greater section B divided in the center, Fig. 4 is a transverse section of A, Fig. 5 is an inside view of the circular guard plate S, with the position of the studs V.

Section A, the section of the coupling showing part of the conduit or waterway and the other appendages of said section.

Section B, the greater section showing the spring conduit and the other appendages.

Section C, the case inclosing spiral spring conduit, the outer and inner chambers and the spiral spring.

Section D, the spring conduit, the inner cylinder of section B, which is moved longitudinally and is pressed by the spiral spring against the packing L at the inner end of section A to form the conduit or waterway through the length of the coupling.

Section E, the swivel fitted to slide into the outer chamber M and revolved on the periphery of the spring conduit.

Section F, the spiral spring in the inner chamber M, the ends of which press against the pads H to move the spring conduit.

Section G, the guard, the circle of the greatest diameter in the coupling in which is located the outer circular groove O.

Section H, the pads against which spiral spring D presses.

Section J, the inner chamber between the case C and the spring conduit which the spiral spring acts.

Section L, the packing to prevent leakage in the joint between the two sections of the conduit or waterway.

Section M, the outer chamber of section B fitted to receive the swivel E at the end of section A in which it revolves.

Section O, the outer groove—a circular groove in the guard G into which the points of the bolt springs Q and N are projected when the two sections are connected together.

Section P, the partition between the outer circular groove O and the inner circular groove I.

Section I, the inner groove—a circular groove in section A. When the two sections are united is directly within the outer circular groove in section B and from which the points of the spring bolts are projected through the partition P into the outer circular groove O.

Section Q, the four or any number of square headed bolts on the upper side and beveled on the underside of the points, sliding radially through the partition P, so that by pressing the two sections A and B together the bolt springs N and Q are forced back until on gaining a line with the outer circular groove O. Then the spring bolts are projected into it.

Section Q, by the spring bolts which connect and hold firmly the said sections together.

Section N, the springs are attached to the square headed bolts Q, in the inner groove I by which the bolts are projected through the partition P into the outer groove O.

Section S, the guard plate—a circular plate to inclose the inner groove I fitted to turn circularly on section A by the knob K.

Section K, the knobs on the upper side of the circular guard plate S by which the guard plate is turned circularly to withdraw the spring bolts Q, from the outer groove.

Section V, the four or any number of studs or pins fastened to the inner side of the circular guard plate S, reaching to the bottom of the inner groove I, between the bolt springs and the partition P, which by turning the circular guard plate S, presses back the spring bolts from their position—withdrawing the bolt heads within the periphery of the partition P.

Section W, the detent a pin or stud fastened in the inner groove I to prevent the circular guard plate S from being moved lower down than the ends of the bolt springs.

Section U is a spiral spring, the end of which is attached to the bottom of the inner groove I and the other end to the inner side of the circular guard plate S, by which the studs V are drawn back again to the detent.

Section R, the lock or small bolt attached to and sliding across the inner side of the circular guard plate S—into a notch in the partition P and is held there by a cup and spring, designed to prevent the spring bolts from being withdrawn from the outer groove O by any designing person or accident by this arrangement the hose coupling may be locked up with a key, knob, or other ways.

Section Y, the outer shell of section A screwed on the conduit to keep the guard plate S in its place, but permitting it to turn freely. It also covers and protects the end of the hose by which some small set screws may be inserted that will fasten on said hose firmly.

Section X, is the outer of section B to protect the end of the hose and make a rim to hold the set to fasten on the said hose with.

What I claim as my invention and improvement in the swivel hose coupling and desire to secure by Letters Patent is—

The spring conduit D and the appendages by which it is moved longitudinally and is held firmly against the packing L and the pads H or rim in which the packing rests to prevent the joint from leaking in combination with the arrangement of spring bolts and their appendages as shown on section A with the circular groove O, for the purposes therein set forth.

SMITH GROOM.

Witnesses:
 YELLAND FOREMAN,
 P. McMANUS.